US010930262B2

United States Patent
Cutler et al.

(10) Patent No.: US 10,930,262 B2
(45) Date of Patent: Feb. 23, 2021

(54) ARTIFICIALLY GENERATED SPEECH FOR A COMMUNICATION SESSION

(71) Applicant: MICROSOFT TECHNOLOGY LICENSING, LLC, Redmond, WA (US)

(72) Inventors: Ross G. Cutler, Clyde Hill, WA (US); Sriram Srinivasan, Sammamish, WA (US); Ramin Mehran, Kirkland, WA (US); Karlton David Sequeira, Seattle, WA (US); Jayant Ajit Gupchup, Seattle, WA (US); Senthil K. Velayutham, Sammamish, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 16/147,838

(22) Filed: Sep. 30, 2018

(65) Prior Publication Data

US 2019/0035383 A1 Jan. 31, 2019

Related U.S. Application Data

(63) Continuation of application No. 15/422,865, filed on Feb. 2, 2017, now Pat. No. 10,147,415.

(51) Int. Cl.
*G10L 13/033* (2013.01)
*G10L 13/08* (2013.01)
(Continued)

(52) U.S. Cl.
CPC ............ *G10L 13/033* (2013.01); *G10L 13/04* (2013.01); *G10L 13/047* (2013.01); *G10L 13/08* (2013.01);
(Continued)

(58) Field of Classification Search
CPC .................................................... G10L 13/033
See application file for complete search history.

(56) References Cited

U.S. PATENT DOCUMENTS

| 7,236,580 | B1* | 6/2007 | Sarkar | ............... H04M 3/567 |
| | | | | 379/202.01 |
| 7,706,510 | B2* | 4/2010 | Ng | ............... H04M 1/72552 |
| | | | | 379/88.14 |

(Continued)

OTHER PUBLICATIONS

"Final Office Action Issued in U.S. Appl. No. 16/177,345", dated Jul. 29, 2020, 12 Pages.
(Continued)

*Primary Examiner* — Shaun Roberts
(74) *Attorney, Agent, or Firm* — NovoTechIP International PLLC (57) ABSTRACT

A device for communicating with a remote device is disclosed, which includes a processor and a memory in communication with the processor. The memory includes executable instructions that, when executed, cause the processor to control the device to perform functions of establishing, via a communication network, a communication session with the remote device; capturing a speech spoken by a user and generating audio data representing the captured speech by the user; encoding the audio data for transmission to the remote device via the communication network; converting the audio data to text data representing the captured speech; and transmitting, during the communication session, the encoded audio data and the text data to the remote device via the communication network. The device thus can provide the text data representing the captured speech when a quality of the encoded audio signal received by the remote device is below a predetermined level.

19 Claims, 3 Drawing Sheets

(51) Int. Cl.
  *H04L 12/26*   (2006.01)
  *G10L 13/047*   (2013.01)
  *H04S 7/00*   (2006.01)
  *H04M 3/22*   (2006.01)
  *H04M 7/00*   (2006.01)
  *G10L 13/04*   (2013.01)
  *H04L 29/06*   (2006.01)
  *H04R 27/00*   (2006.01)
  *G10L 19/00*   (2013.01)

(52) U.S. Cl.
  CPC .......... *H04L 43/08* (2013.01); *H04L 65/1069* (2013.01); *H04L 65/602* (2013.01); *H04L 65/80* (2013.01); *H04M 3/2236* (2013.01); *H04M 7/006* (2013.01); *H04M 7/0084* (2013.01); *H04S 7/30* (2013.01); *G10L 19/0018* (2013.01); *H04M 2201/40* (2013.01); *H04R 27/00* (2013.01); *H04R 2227/003* (2013.01); *H04S 2420/01* (2013.01)

(56) References Cited

U.S. PATENT DOCUMENTS

| | | | | |
|---|---|---|---|---|
| 2002/0103656 | A1* | 8/2002 | Bahler | G10L 17/24 706/14 |
| 2002/0156900 | A1* | 10/2002 | Marquette | H04L 29/06 709/227 |
| 2003/0125947 | A1* | 7/2003 | Yudkowsky | G10L 15/07 704/247 |
| 2003/0204596 | A1* | 10/2003 | Yadav | H04L 47/10 709/226 |
| 2004/0143438 | A1* | 7/2004 | Cabezas | G06F 21/64 704/260 |
| 2005/0099992 | A1* | 5/2005 | Sato | H04L 1/0003 370/350 |
| 2009/0198497 | A1* | 8/2009 | Kwon | G10L 13/033 704/260 |
| 2011/0093272 | A1* | 4/2011 | Isobe | G10L 13/10 704/258 |
| 2014/0214426 | A1* | 7/2014 | Kanevsky | G10L 15/08 704/257 |
| 2015/0255068 | A1* | 9/2015 | Kim | G10L 17/04 704/246 |
| 2016/0210960 | A1* | 7/2016 | Kim | H04W 4/18 |
| 2018/0096690 | A1* | 4/2018 | Mixter | G06F 3/167 |

OTHER PUBLICATIONS

"Non-Final Office Action Issued in U.S. Appl. No. 16/177,345", dated Apr. 8, 2020, 15 Pages.

* cited by examiner

ARTIFICIALLY GENERATED SPEECH FOR A COMMUNICATION SESSION

CROSS-REFERENCE TO RELATED APPLICATIONS

This application is a continuation of co-pending U.S. patent application Ser. No. 15/422,865, titled "ARTIFICIALLY GENERATED SPEECH FOR A COMMUNICATION SESSION," filed on Feb. 2, 2017, which is incorporated hereto in its entirety.

BACKGROUND

Various systems are known which enable a user to send spoken audio to another user over a network, e.g. over a packet-based network such as the Internet or a private intranet, for instance in a live voice or video call such as a VoIP (voice over Internet Protocol) call. To enable this, typically each of the users installs a respective instance of a communication client application (e.g. VoIP client) on his or her respective user terminal. Alternatively, one or both of the users may use a web-hosted instance of the communication client. In some scenarios the call or other such communication session can also comprise video.

Calls and other audio or video sessions use networks that often have significant packet loss and jitter, which impair audio quality. Poor networks are the top reason why ~5-20% of all audio calls (depending on region) are rated poor or very poor. Thus, loss and jitter can be mitigated and concealed but not eliminated. Previous solutions use forward error correction (FEC), audio concealment, or multi-path transmission techniques to mitigate network loss. However, significant loss can still result in unintelligible audio which makes communication difficult or impossible. Many calls with loss have large bursts of packet loss which makes FEC ineffective. Regarding jitter, this can be mitigated using a jitter buffer at the receive side. Increasing the length of the jitter buffer increases tolerance to jitter, but this comes at the cost of increased delay. In short, all techniques to deal with imperfect network conditions come with a limit or trade-off of one sort or another.

In one known alternative solution, a transmitting device captures voice information from a user, uses speech recognition to convert the voice information into text, and communicates packets encoding the voice information and the text to a receiving device at a remote location. The voice and text are sent in separate streams with different service levels. The receiving device receives and decodes the packets containing the voice and text information, outputs the voice information through a speaker, and outputs the text information on a visual display. Thus, the system provides both real-time voice communications and a reliable stream of text encoding those voice communications in case of poor network conditions. In this way, communications equipment can display a substantially real-time transcript of a voice communications session for reference during the conversation, to supplement the voice communications during periods of reduced transmission quality, or to save for future reference.

Furthermore, a text-to-speech module at the receiving device is also able to detect a degradation in a quality of the packet-based voice communications session, and to output the transmitting user's voice information using speech synthesis to convert the remote text into an audio output. Thus, the voice-to-text module can supplement poor quality voice communications with synthesized speech.

SUMMARY

A device is disclosed, which includes a processor and a memory in communication with the processor. The memory includes executable instructions that, when executed, cause the processor to control the device to perform functions of establishing, via a communication network, a communication session with a remote device; capturing a speech spoken by a user and generating audio data representing the captured speech by the user; encoding the audio data for transmission to the remote device via the communication network; converting the audio data to text data representing the captured speech; and transmitting, during the communication session, the encoded audio data and the text data to the remote device via the communication network.

In another implementation, a method of operating a device is disclosed, which includes establishing, via a communication network, a communication session with a remote device; capturing a speech spoken by a user and generating audio data representing the captured speech by the user; encoding the audio data for transmission to the remote device via the communication network; converting the audio data to text data representing the captured speech; and transmitting, during the communication session, the encoded audio data and the text data to the remote device via the communication network.

In another implementation, a device is disclosed, which includes means for establishing, via a communication network, a communication session with a remote device; means for capturing a speech spoken by a user and generating audio data representing the captured speech by the user; means for encoding the audio data for transmission to the remote device via the communication network; means for converting the audio data to text data representing the captured speech; and means for transmitting, during the communication session, the encoded audio data and the text data to the remote device via the communication network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

The following describes a system which uses automatic speech recognition (ASR) on the speech captured at the transmit side and transmits the resulting text reliability and simultaneously with the audio stream, to thereby increase the network resiliency of a live audio communication session such as a VoIP call. The recognized speech is sent to the receiving end, where a user-specific text-to-speech voice can fill in the distorted audio when it is detected that audio quality is poor due to network loss or other such effects. The conversion from text to speech at the receive side is based on a user-specific model specific to the user from whom the speech was originally captured at the send side.

In embodiments, a visual cue can be used to notify the receiving user when this is happening. Alternatively or additionally, the text-to-speech voice may be spatially separated so that it sounds separate from the rest of the conversation, e.g. by playing only to the left or right channel, or by using a head-related transfer function (HRTF) (the simplest is to). The HTRF may be generic or specific to the receiving user.

In some embodiments, the received text may also be displayed as subtitles. This may comprise displaying the subtitles only in response to detecting that audio quality is poor at the receive side, e.g. only displaying the lost words or interrupted phrases or sentences. Alternatively, subtitles can also be displayed on-demand or by user-defined rules to allow the user to recall the text of what was recently said, e.g. to allow the receiving user to see the transcript at any time, such as to follow a meeting. The manual mode can be used for accessibility.

Figure 1:
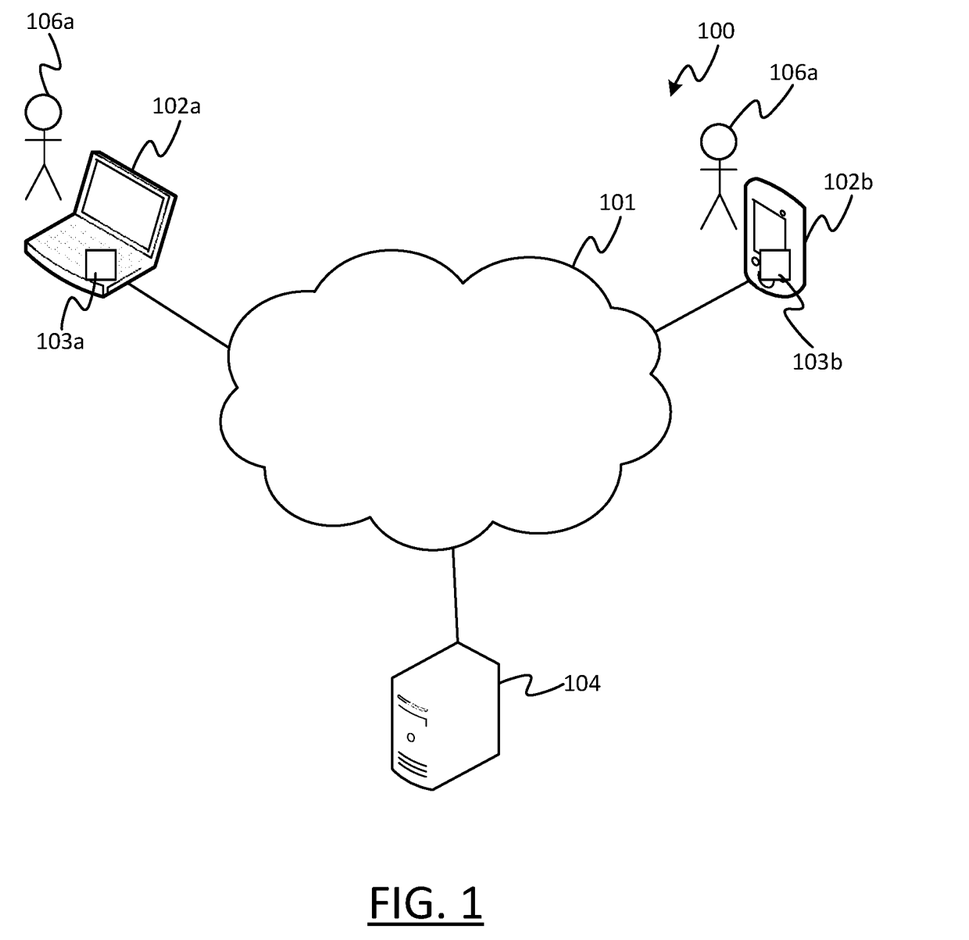
FIG. 1 is a schematic diagram of a communication system.

FIG. 1 schematically illustrates a communication system 100 in accordance with embodiments disclosed herein. The communication system comprises a plurality of user terminals 102 each configured to connect to a computer network 101, and each installed with a respective instance of a communication client application 103. Each of the user terminals 102 is also used by at least one respective user 106. In FIG. 1, two user terminals and their respective clients and users are shown for illustrative purposes: a first user terminal 102a installed with a first communication client 103a, and a second user terminal 102b installed with a second communication client 103b (in embodiments, each client 103a, 103b being a respective instance of the same client product). However, it will be appreciated that there may be different numbers of user terminals 102 involved in other scenarios covered by the present disclosure. The network 101 is preferably a packet-based network. In embodiments it may take the form of a wide-area internetwork such as that commonly referred to as the Internet. Alternatively, the network 101 may take the form of another type of network such as a company intranet, a mobile cellular network, or a wireless local area network (WLAN), or a combination of any of these and/or the Internet.

Each of the user terminals 102 may take any of a variety of different forms, such as a desktop computer, laptop, tablet, smartphone, smart watch, pair of smart glasses, smart TV, or set-top box (and the different user terminals 102 need not necessarily take the same form as one another). Note therefore that the term "computer" as used herein does not restrict to a traditional desktop or laptop computer.

The communication clients 103 are each installed on computer-readable storage of their respective user terminal 102 and arranged for execution on a respective processing apparatus of the respective user terminal 102. The storage may take the form of one or more storage media (e.g. magnetic memory, electronic memory and/or optical memory) implemented in one or more memory units. The processing apparatus may take the form of one or more processing units. Each of the communications clients 103 is configured so as to be able to establish an audio communication session with one or more others of the communication clients 103 running on one or more of the other respective user terminals 102, e.g. to establish a voice or video call such as a VoIP call. The user of each user terminal 102 is then able to transmit audio (and optionally video) to each other of the users of each other of the user terminals 102 participating in the session.

By way of illustration, embodiments below may be described from the perspective of the first user 106a sending a message to the second user 106b, but it will be appreciated that similar teachings may also apply in the reverse direction and/or in relation to other combinations of users.

The transmitted audio comprises speech spoken by the sending user 106a, captured from an internal or external microphone at transmitting user terminal 102a. In particularly advantageous applications of the presently disclosed techniques, the audio is transmitted live, i.e. on-the-fly, as-and-when it is captured, such as in a live VoIP call or the like. The transmitted content may also comprise video (e.g. live video) captured by an internal or external video camera at the transmitting user terminal 102a, e.g. a head-and-shoulders shot of the sending user 106a. The captured audio and optional video are encoded (i.e. compressed) by the sending client application 103a and transmitted in encoded form over the network 101 to the client 103b on the receiving terminal 102b. Note therefore that where it is said the audio data comprises the speech of the sending user 106a, or such like, this will be understood to cover the typical scenario in which the audio data is transmitted in encoded (compressed) form, and similarly for any transmitted video. The receiving client 103b decodes and plays out the received audio through one or more internal or external speakers at the receiving terminal 102b, and optionally decodes and plays out any receive video through an internal or external display screen.

In embodiments the communication system 101 comprises a server 104 connected to the network 101, arranged to provide a communication service via which the communication session is at least in part conducted. In such embodiments, the audio and optional video from any given one of the users may be sent from the client 103a on the sending user terminal 102a to the server 104 via the network 101, and the server 104 may be configured to forward the audio and any video onward via the network 101 to the client 103b on the recipient user terminal 102b (or to each of the recipient terminals in a multiparty communication session). Note that a server herein refers to a logical entity which may be physically implemented by one or more server units located at one or more geographical sites. Distributed storage and computing techniques in themselves will be familiar to a person skilled in the art. Note also that it is not essential for the audio and/or video to be transmitted via the server. Instead such content may be transmitted directly between the terminals 102a, 102b (i.e. without being relayed via a server). In such cases a server 104 may not be required at all (a pure peer-to-peer system), or the server 104 may still be included in the system to provide one or more supporting functions such as providing authentication certificates, address look-up, or hosting of supplemental information such as contact lists, user profiles, user permission settings, and/or presence statuses.

Note also, in yet further embodiments, the system need not comprise a communication client 103 installed on each user terminal 102. For instance, alternatively one, some or all of the user terminals could instead be installed with a general-purpose web browser operable to access a web-based version of the client application ("web client") hosted on the server 104. In such cases the described functionality may be achieved by the web-client rather than the locally installed client (i.e. client installed locally on an individual user terminal 102). Or more generally, the functionality disclosed herein can be implemented by any combination of a local client application 103 (on each user terminal 102) and/or server hosted functionality (e.g. a web client). For conciseness the various options in this respect will not be repeated each time the functionality below is described, but it will be understood that these options apply throughout.

Figure 3A:
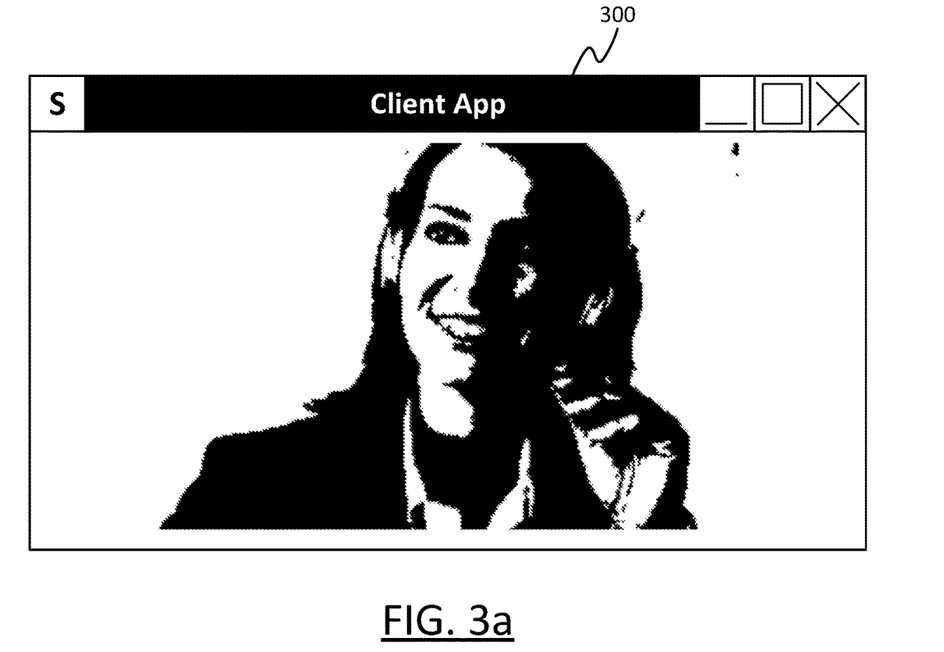
FIG. 3*a* is a schematic mock-up of a user interface.

FIG. 3a gives a schematic mock-up of an example of the front-end user interface (UI) 300 of the client application 103b running on the receiving user's terminal 102b (or of the web client accessed from the receiving user's terminal 102b). When conditions over the network 101 are good, the receiving user 106b sees the video of the sending user 106a played out on screen, and the speech captured from the sending user's voice is played out audibly through the speaker(s) of the receiving terminal 102b. However, when conditions over the network 101 are poor (e.g. high loss or error rate, long delay and/or high jitter), then there may not be sufficient bandwidth to play out the video or even to play out the audio, or at least not with a quality that allows the sending user's speech to be well understood by the receiving user 106b, or not with a quality that is tolerable for the receiving user 106b to listen to.

To accommodate such situations or similar, according to the present disclosure the sending client 103a is configured with a speech-to-text converter to convert the sending user's locally captured speech to the receiving user terminal 102b, e.g. in parallel with the audio but in separate packets. The receiving client 103b is configured with a text-to-speech converter comprising a model of the sending user's voice, arranged to convert the received text to synthesized speech at the receive end based on said model, and play this out to the receiving user 106b. This may be done in response to a detection at the receiving client 103b that the network conditions experienced upon reception have fallen below a threshold quality according to a predetermined quality classifier. Alternatively, the text-to-speech conversion could be activated on some other basis, e.g. turned on manually by the receiving user 106b.

Figure 2:
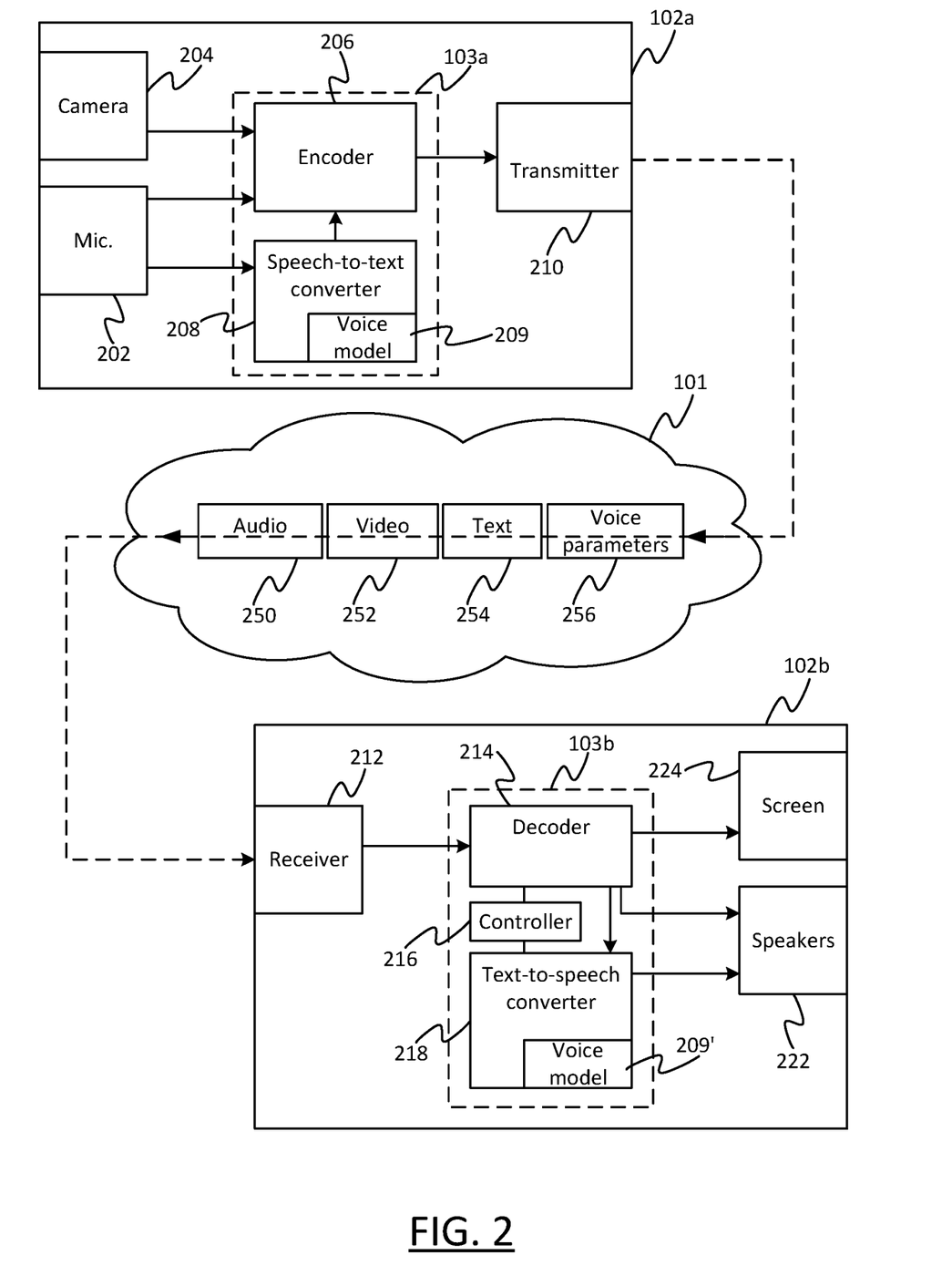
FIG. 2 is a schematic block diagram of a transmitting and receiving terminal.

More detail is shown in FIG. 2. The transmitting user terminal 102a comprises a microphone 202, an optional video camera 204, the transmitting client 103a, and a transmitter 210 in the form of a transmitting network interface for connecting to the network 101. The transmitting client 103a comprises an encoder 206 and a speech-to-text converter 208, the speech-to-text converter 208 comprises a voice model specific to the voice of the transmitting user 103a. Alternatively part or all of the voice model 209 or the speech-to-text converter 208 itself need not be part of the client application 103a, but instead the client application 103a could be configured to access a voice model 209 or speech-to-text converter 208 present elsewhere on the transmitting user terminal 103 for another purpose, e.g. as part of a dictation application or a speech control software of the operating system.

The microphone 202 may be internal or external to the housing of the transmitting user terminal 102a. Either way, it is arranged to capture audio from its surroundings including speech from the transmitting user 106a, and to supply the audio including the captured speech to the encoder 206, which encodes (i.e. compresses) the audio for transmission over the network 101 via the transmitting interface 210. Similarly the video camera 204, if used, may be internal or external to the housing of the transmitting user terminal 102a. Either way it is arranged to capture video from its surroundings, e.g. a talking head shot of the transmitting user 102a, and to supply this to the encoder 206 which encodes it for transmission over the network 101 via the transmitting interface 210 as part of the same session (e.g. call) as the transmitted audio.

The speech-to-text converter 208 is arranged so as to also receive an instance of the captured audio, including the sending user's speech, and to convert this into a textual representation of the same speech content based on the model 209 of the sending user's voice as maintained at the transmitting user terminal 102a. The model 209 at the sending side may be trained based on any known speech recognition training techniques, such as by having the sending user reading one or more passage of predetermined text, and/or by the sending user dynamically training the model 209 by correcting its speech-to-text predictions in an ongoing manner (e.g. during the call or other such session). The model 209 may be trained specifically for the purpose of the client application 103 (e.g. VoIP client) and its corresponding communication service (e.g. VoIP service). Alternatively, the model 209 may be trained and made available for some other or shared purpose, such as for dictation or voice control of the operating system on the transmitting terminal 102a. In the former case the model 209 and speech-to-text converter 208 may be a dedicated part of the client application 103a. Alternatively in the latter case, the model 209 or indeed the speech-to-text converter 208 may be part of another application or the operating system (not shown) and merely accessed by the client application 103a. A combination of these approaches could also be used.

The speech-to-text converter 208 is configured to supply the converted text to the encoder 206 to synchronize this converted text with the corresponding audio from which it was generated. This may be achieved by the encoder inserting timestamps into portions of the converted text data that match the timestamps in corresponding portions of the encoded audio and optionally the video, e.g. matching the timestamps of corresponding frames, packets or other such subdivisions of the audio and optional video. The encoder 206 then sends the timestamped text data over the network 101 via the transmitting interface 210 as part of the session (e.g. call). The text data may be transmitted in uncompressed form, since it incurs a relatively very small bitrate compared to the audio, or alternatively the encoder 206 may encode the text for transmission as well as the audio and any video. Note therefore that where it is said that the transmitted content comprises text, or the like, this does not exclude the possibility that the text may be sent in encoded (compressed) form.

The transmitting interface may take any suitable form for transmitting the encoded audio and optional video over the network (e.g. Internet) 101, for instance a wireless interface for accessing the network 101 via a wireless router, wireless access point or a base station of a mobile cellular network; or a wired modem or such like for accessing the network 101 via wired means such as a PSTN phone line, optical cable or Ethernet connection.

As described in relation to the client 103a, the encoder 206, speech-to-text converter 208 and speech model 209 may be implemented in software stored in any suitable storage medium or media of the transmitting user terminal 102a, and arranged of be fetched and run on any suitable processing apparatus of the transmitting terminal 102a. Examples of suitable storage media include electronic storage media such as a solid state drive (SSD) or other EEPROM, magnetic media such as a hard disk or other magnetic drive, and/or optical memory such as a CDROM drive or other optical drive. Examples of suitable processing apparatus include a single or multiple core processing unit, or an arrangement of multiple such processing units.

The receiving user terminal 102b comprises one or more speakers 222, a display screen 224, the receiving client 103b, and a receiver 212 in the form of a receiving network interface. The receiving client 103b comprises a decoder 214, a controller 216, and a text-to-speech converter 218, the speech-to-text converter 218 comprising a voice model 209' specific to the sending user's voice maintained at the receiving user terminal 102b. Or as an alternative implementation, part or all of the voice model 209' or the text-to-speech converter 218 itself could be a separate element to the client application 103a. Each of the speaker(s) 222 and screen 224 may be internal or external to the housing of the receiving user terminal 102b. Like the transmitting interface 210, the receiving interface 212 may take any suitable form for receiving the encoded audio and optional video over the network (e.g. Internet) 101, for instance a wireless interface for accessing the network 101 via a wireless router, wireless access point or a base station of a mobile cellular network; or a wired interface or modem for accessing the network 101 via wired means such as a PSTN phone line, optical cable or Ethernet connection.

As already described in relation to the receiving client 103b, the decoder 214, controller 216, text-to-speech speech converter 218 and speech model 209' may be implemented in software stored in any suitable storage medium or media of the transmitting user terminal 102a and arranged of be fetched and run on any suitable processing apparatus of the transmitting terminal 102a. Again, examples of suitable storage media include electronic storage media such as a solid-state drive (SSD) or other EEPROM, magnetic media such as a hard disk or other magnetic drive, and/or optical memory such as a CDROM drive or other optical drive; and examples of suitable processing apparatus include a single or multiple core processing unit, or an arrangement of multiple such processing units.

The transmitter 201, under control of the encoder 206, is arranged to send the converted text data 254, the encoded audio data 250 and (optionally) the encoded video 252 to the receiving user terminal 102b. The receiving terminal 102b receives these via the receiving interface 212 and passes the audio data 252 and (optional) video data 254 to the decoder to decoded and played out via the speaker(s) 222 and screen 224 respectively.

Further, the controller 216 is configured to determine when to control the text-to-speech converter 218 to convert the received text data 254 into synthesized speech and to play this synthesized speech out through the speaker(s) 222 in place of the received audio 250. To make this determination, preferably the controller 216 is configured detect when the quality of the network connection formed over the network 101 between the transmitting interface 210 of the transmitting terminal 102a and the receiving interface 212 of the receiving terminal 102b, over which the audio 250 and (optionally) the video 252 is received, falls below a predetermined level of quality. This is done based on a quality classifier evaluated by the controller 216 based on the connection quality as experienced at the receive side 102b, 212. Quality classifiers for classifying the quality of a network connection are in themselves known in the art. The classifier may be based on any one or a combination of network parameters that affect the receiving user's experience of the received audio, for instance: loss rate (e.g. packet loss rate); error rate (e.g. packet error rate); concealment rate (e.g. proportion of packets or frames concealed by the decoder); delay; and/or jitter.

Based on any such suitable classifier, the controller 216 classifies whether, at the current moment in time, its experience of the network conditions is such that the received audio 250 is deemed usable or not usable (e.g. too bad to be understandable or too annoying to be practically usable). If the latter, then in response the controller 216 supplies the received text 254 to the text-to-speech converter 218 and controls it to play out the speech synthesized from this text through the speaker(s) 222. The controller 216 also controls the decoder 214 to temporarily stop playing out the poor quality received audio 250. This continues until such time as the controller 216 detects that the connection quality is classified as good again, and then the controller 216 controls the text-to-speech converter 218 to stop playing out the synthesized speech and instead controls the decoder 214 to start playing out the received audio 250 again. Thus, at times the received audio 250 is played out, and at other times the artificially generated audio is played out (but not both at the same time). The controller 216 uses the timestamps in the received text 254 and audio 250 to ensure that the synthesized speech supplied to the text-to-speech converter 218 correctly lines up and fills the gaps between the switched-out audio 250, i.e. so that the periods of synthesized speech and the periods of playing out the received audio 250 are synchronized.

Note: although it may be preferred that the controller 216 automatically classifies the quality of the audio and switches between the received audio 250 and synthesized speech in dependence on this, this is not the only possibility. In embodiments the switching could be performed on some other alternative or additional basis, e.g. in response to a user selection input to the controller 216 through a user interface of the receiving client 103b, selecting to manually to turn on or off the synthesized speech. Thus, the receiving user 106b may decide for him- or herself whether the received audio 250 is unintelligible or too annoying, and in response to this select to manually switch to the artificial speech instead.

In embodiments, the decoder 214 may also be arranged to play out some or all of the received text 254 in text form as subtitles. The controller 216 may be arranged to control the decoder 214 to output the text subtitles only when the connection is classified as poor, as above with regard to the synthesized speech. Alternatively, the decoder 214 may be arranged to display the subtitles continually throughout the session (e.g. call), even when conditions are classified as good; or the controller 216 may be configured to control the decoder 214 selectively display the subtitles on some other basis, e.g. when turned on by the receiving user 106b. In further embodiments, the controller 216 may be configured so as, when the receiving user activates an associated control in a user interface of the client application 103b, to display a history of past-received subtitle text, e.g. all the text 254 received within a certain predefined time window or a certain user-selected time window.

In embodiments the text data 254 may be transmitted throughout the entire session (e.g. call), continually in parallel with the corresponding audio, i.e. so the transmitted content always comprises both audio 250 and text 254 representing the same periods of the session (e.g. call). In this case the controller 216 is configured to control the text-to-speech converter to only play out the synthesized speech from certain selected portions of the received text during periods of the session (e.g. call), such as when conditions are classified as poor or when selected by the receiving user 106*b*. Alternatively the transmitting client 103*a* may be configured to only transmit the text data 254 at certain times. For instance, the controller 216 may be configured to feed back a report to the transmitting client 103*a* informing it when the network conditions experienced at the receive side are classified as poor. In response, the speech-to-text converter 208 may only transmit the text data during such periods. The encoder 206 may also be configured to temporarily stop transmitting the audio 250 (and optional video 252) during such periods. Thus, in some alternative embodiments, the transmitted content may comprise only the audio 252 (and optionally video 252) but not the text data 254 during certain periods of the session (e.g. call), and only the text data 254 but not the audio 250 (nor video 252) during other periods of the same session.

Either way, the text 254 is transmitted and received using a communication modality that has a higher robustness than that used for the audio data 250 (and video data 252 if present). This exploits the fact that the text data 254 will be much smaller in size than the audio data 250 (and any video data 252), i.e. incur a much smaller bitrate, and hence a more robust communication means can be afforded even in poor network conditions.

In embodiments, this comprises transmitting and receiving the text data 254 using a transport layer protocol such as TCP that requires retransmission of unreceived packets, whereas the audio 250 (and video 252 if present) is sent and received using a transport layer protocol that does not involve retransmission (e.g. RTP or UDP). Retransmission can be achieved for example (as in TCP) by having the transport layer at the receiving terminal 102*b* acknowledge received packets and having the transport layer at the transmitting terminal 102*a* retransmit any packets that are not acknowledged as received (the packets being identified by their sequence number). Another possibility is that transport layer at the receiving terminal requests retransmission of missing packets (which it identifies as missing due to missing sequence numbers).

Another alternative or additional possibility for more robust transmission and reception is to send the text data 254 with a higher service level than the audio data 250 (and any video 252), e.g. a higher QoS (Quality of Service). For instance, the higher service level may be arranged to cause routers over the network 101 to prioritize not dropping the packets of text data 254 when there is network congestion and the router has to drop packets.

In yet another alternative or additional variant, the text data 254 may be sent with more redundant information than the audio 250 (and any video 252). E.g. multiple duplicate instances of the same text packets could be sent, or a more robust checksum (incurring more bits) may be included for each packet or other such portion of text data 254.

Furthermore, according to the particular techniques of the present disclosure, the generation of the synthesized speech is based on a model of the transmit-side user's voice—i.e. specific to the voice of the transmitting user 106*a*—but which is stored, maintained and applied at the received side 102*b*, 218.

The receive-side model 209' comprises one or more parameters of the transmitting user's voice, e.g. the fundamental pitch (i.e. fundamental frequency), the mean of the fundamental pitch, the variance of the fundamental pitch, and/or spectral information such as in the form of linear prediction coefficients or mel-cepstral coefficients. Various parameters parametrizing the human voice are in themselves known to a person skilled in the art. In embodiments, values of one or more of these parameters may be provided to the receiving terminal 102*b* "up front", either at some point in advance of the session such as when the transmitting and receiving users 103*a*, 103*b* first become contacts, or at least at the beginning of the call. For instance, the one or more values of the one or more parameters may be sent by the transmitting client 103*a* to the receiving client 103*b* based on the transmit-side model 209 maintained at the transmitting terminal 102*a*.

Alternatively or additionally, in embodiments, the transmitting client 103*a* may be configured to send one or more values of one or more of the voice parameters to the receiving client 103*b* dynamically during the call, along with the audio stream 250. The receiving client 103*b* can then use these to dynamically adapt the receive-side voice model 209'. For instance, consider the case where, during the call or session, the transmitting user 106*a* makes one or more manual corrections to the converted text generated by the speech-to-text converter 208 based on the transmit-side model 209. This will result in the transmit-side model 209 being trained so as to update the values of one or more of the voice parameters in the transmit-side model 209. In addition, in accordance with embodiments herein, the transmitting client may be configured to transmit the values of the one or more updated parameters 256 to the receiving client 103*b* during the same session (e.g. call) in which those updates were made. In response, the receiving client 103*b* updates the values of those parameters in the receive-side model 209', again during the same session (e.g. call). Thus, the receive-side voice model 209' can be dynamically updated.

Note that where it is said that the receiving user terminal 102*b* or client 103*b* receives one or more speech parameters (or indeed the audio 250, video 252 and text 254) from the transmitting user terminal 102*a* or client 102*b*, this does not exclude that the data in question could be received via the server 104 or other intermediate element.

As another variant, the one or more parameters may be sent to the receiving client 103*b* from the server 104 based on values originating from another user terminal of the sending user 106*a*. For instance, the parameters may be trained by the sending user 106*a* at some point in advance using a different user terminal other than the sending user terminal 102*a* that is used during the session or call itself. I.e. the one or more parameters may be received from the transmitting user terminal, or may originate from another user terminal of the transmitting user. Or indeed a combination of such approaches could be used.

Another alternative or additional possibility is that the text-to-speech converter 218 is configured to train the receive-side voice model 209' dynamically based on the received audio 250 in conjunction with the received text 254 during periods of good network conditions. This embodiment works when text 254 and audio 250 is received for the same content, i.e. same periods of text, such as when the text 254 is sent continually throughout the whole call. Since the text-to-speech converter 218 has access to the audio 250 and text 254 for the same content, it is able to train the receive side model 209 in much the same way as speech recognition software is trained based on the user reading out predetermined passages pre-known to the conversion software.

Figure 3B:
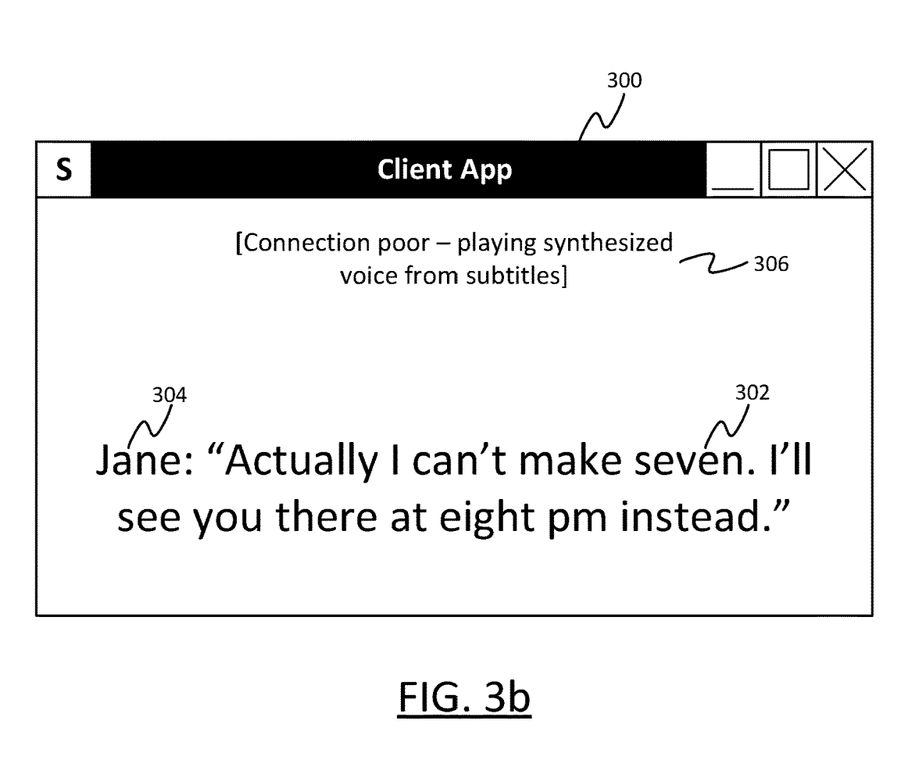
FIG. 3*b* is another schematic mock-up of a user interface.

FIG. 3*b* shows a schematic mock-up of an example user interface 300 of the receiving client 103*b* in circumstances when network conditions are classified as poor. The received audio 250 and any video 252 are no longer played out, and instead the received text 254 is displayed on the screen 224 as live subtitles 302. Further, the subtitles are played out as synthesized speech via the text-to-speech converter 218 and speaker(s) 222. In embodiments, the controller 216 may be configured to control the user interface to also display the name 304 of the transmitting user 106*a* who speech is currently being displayed as subtitles, which may be useful in multiparty call (i.e. with three or more participants). Further, preferably the controller 216 is configured to provide an indication to the receiving user 106*b* that the speech being heard is synthesized speech. For instance, this may take the form of a visual indication 306 displayed on the screen 224 through the graphical user interface of the receiving client, e.g. in the form of an icon or other such graphic, and/or a written message explaining to the receiving user that the currently played out speech is synthesized due to poor network conditions.

Another alternative or additional option for providing such an indication to the receiving user is to provide an audible indication via the speaker(s) 222. One particular way of doing this in the case of two or more speakers is to use stereo or surround sound in order to place the synthesized speech at a distinct spatial position from the perspective of the receiving user 106*b*, distinct compared to the position at which the regular received audio 250 is played out. An example of using stereo would be to play out the received audio 250 centrally, i.e. evenly through both speakers, but to play out the synthesized speech only through one of the two speakers 222, or weighted toward one of the speakers, thus making it sound like it comes from a direction off to one side. In the case of surround sound (more than two speakers at different positions around the receiving user 106*b*), a head related transfer function (HRTF) may be used to place the synthesized speech at a distinct position, including giving the sensation of forward or backward and/or up or down directions. HRTFs in themselves are known in the art.

It will be appreciated that the above embodiments have been described only by way of example.

For instance, in alternative implementations the speech-to-text conversion may be implemented at a server 104 instead of at the transmitting terminal 102*a*, with the converted text being forwarded to the receiving terminal 102*b*. Alternatively, the text-to-speech could be performed at a server 104 and the synthesized speech forwarded to receiving user terminal 102*b*. Such implementations are less preferred since the former does not accommodate poor network conditions between the transmitting user terminal 102*a* and the server 104, whilst the latter does not accommodate poor network conditions between the server 104 and the receiving user terminal 102*b*. Nonetheless they do still provide some benefit is there are poor conditions on the other leg of the route. And in multiparty scenarios (three or more users), there may be a desired trade-off in storing and applying the voice models in the cloud (i.e. on a server). That is, for N-endpoint calls it may not be desirable to have $N^2$ transfers of the voice model (everyone to everyone) but only $O(N)$ transfers.

Further, regarding the measuring and/or classifying of the network conditions, this could also be assisted by a server. In this case the server 104 may measure one or more factors such as loss, error rate, delay, jitter, etc. and report them to the controller 216 on the receiving terminal 102*b* which performs the classification based on the reported values. Or the server 104 could perform the classification and report this to the controller 216, in which case the controller 216 determines the network conditions simply by receiving the report.

In further embodiments, the communication session is not limited to being a call in the sense of a two-way live communication. Alternatively, the session could be a live one-way communication session such as a remotely-presented lecture or other such presentation, or a live internet TV show. As another possibility the session could also comprise the streaming of pre-recorded audio or video, such as in an internet audio or video streaming service, e.g. internet TV, movie or radio service.

Other variants or applications of the techniques disclosed herein may become apparent to the person skilled in the art in light of the present disclosure. The scope of the disclosure is not limited by the described embodiments but only by the accompanying claims.

What is claimed is:

1. A system comprising first and second devices in communication with each other via a communication network, the system comprising:
   a processor; and
   a memory in communication with the processor, the memory comprising executable instructions that, when executed by the processor, cause the processor to control the system to perform functions of:
      during a communication session between the first and second devices, capturing, at the first device, a first speech spoken by a person, the first and second device storing a speech model specific to the person;
      generating audio data representing the captured first speech;
      converting, based on a speech model stored at the first device, the audio data to text data representing the captured first speech;
      during the communication session, transmitting, to the second device via the communication network, the audio data and the text data;
      receiving, at the first device, a user input that trains the speech model stored at the first device, the user input comprising correction of the text data converted from the audio data;
      updating, based on the received user input, a voice parameter value of the speech model stored at the first device;
      during the communication session, transmitting, to the second device via the communication network, the updated voice parameter value of the speech model;
      during the communication session, updating, at the second device, the speech model stored at the second device based on the updated voice parameter value transmitted to the second device; and
      converting, at the second device, the text data transmitted to the second device to a second speech based on the updated speech model stored at the second device.

2. The system of claim 1, wherein:
   the voice parameter value is dynamically updated in response to the user input received during the communication session, and
   in response to the updating of the voice parameter value, the updated voice parameter value is dynamically transmitted to the second device during the communication session.

3. The system of claim 1, wherein the text data and the audio data are continuously transmitted in parallel to the second device via the communication network.

4. The system of claim 1, wherein the text data is selectively transmitted to the second device when a predetermined condition is met.

5. The system of claim 4, wherein the predetermined condition includes a condition that a quality of the audio data received by the second device is below a predetermined level.

6. The system of claim 4, wherein, for selectively transmitting the audio data, the instructions further include instructions that, when executed by the processor, cause the processor to control the system to perform functions of:
- transmitting the audio data to the second device via the communication network;
- receiving, from the second device, a feedback signal indicating that the predetermined condition is met; and
- in response to receiving the feedback signal, stopping transmitting the audio data and starting to transmit the text data to the second device via the communication network.

7. The system of claim 1, wherein the instructions further include instructions that, when executed by the processor, cause the processor to control the system to perform a function of synchronizing the text data with the audio data.

8. The system of claim 7, wherein, for synchronizing the text data with the audio data, the instructions further include instructions that, when executed, cause the processor to control the system to perform functions of:
- inserting a first time stamp into a portion of the audio data; and
- inserting a second time stamp into a portion of the text data corresponding to the portion of the audio data.

9. The system of claim 1, wherein, for transmitting the audio data and the text data, the instructions, when executed by the processor, further cause the processor to control the system to perform a function of transmitting the audio data and the text data in separate packets to the second device via the communication network.

10. The system of claim 1, wherein, for transmitting the audio data and the text data, the instructions, when executed by the processor, further cause the processor to control the system to perform functions of:
- transmitting, to the second device, the audio data via a first communication modality; and
- transmitting, to the second device, the text data via a second communication modality having a higher robustness than the first communication modality.

11. The system of claim 10, wherein, for transmitting the audio data and the text data, the instructions, when executed by the processor, further cause the processor to control the system to perform functions of:
- transmitting, to the second device, the text data via a first transport layer protocol requiring retransmission of unreceived packets, and
- transmitting, to the second device, the audio data via a second transport layer protocol not involving retransmission of unreceived packets.

12. The system of claim 11, wherein, for transmitting the audio data and the text data, the instructions, when executed by the processor, further cause the processor to control the system to perform functions of:
- transmitting, to the second device, the text data at a first quality of service level, and
- transmitting, to the second device, the audio data at a second quality of service level that is lower than the first quality of service level.

13. A method of operating a system comprising first and second devices in communication with each other via a communication network, comprising:
- during a communication session between the first and second devices, capturing, at the first device, a first speech spoken by a person, the first and second devices storing a speech model specific to the person;
- generating audio data representing the captured first speech;
- converting, based on a speech model specific to the person, the audio data to text data representing the captured first speech;
- during the communication session, transmitting, to the second device via the communication network, the audio data and the text data;
- receiving, at the first device, a user input that trains the speech model stored at the first device, the user input comprising correction of the text data converted from the audio data;
- updating, based on the received user input, a voice parameter value of the speech model stored at the first device;
- during the communication session, transmitting, to the second device via the communication network, the updated voice parameter value of the speech model;
- during the communication session, updating, at the second device, the speech model stored at the second device based on the updated voice parameter value transmitted to the second device; and
- converting, at the second device, the text data transmitted to the second device to a second speech based on the updated speech model stored at the second device.

14. The method of claim 13, wherein transmitting the audio data and the text data comprises continuously transmitting the text data and the audio data in parallel to the second device via the communication network.

15. The method of claim 13, wherein transmitting the audio data and the text data comprises selectively transmitting the text data to the second device when a predetermined condition is met.

16. The method of claim 15, wherein the predetermined condition includes a condition that a quality of the audio data received by the second device is below a predetermined level.

17. The method of claim 15, wherein transmitting the audio data and the text data comprises:
- transmitting the audio data to the second device via the communication network;
- receiving, from the second device, a feedback signal indicating that the predetermined condition is met; and
- in response to receiving the feedback signal, stopping transmitting the audio data to the second device and starting to transmit the text data to the second device via the communication network.

18. The device of claim 15, wherein transmitting the audio data and the text data comprises:
- transmitting, to the second device, the audio data via a first communication modality; and
- transmitting, to the second device, the text data via a second communication modality having a higher robustness than the first communication modality.

19. A non-transitory computer readable medium containing instructions which, when executed by a processor, cause the processor to control a system, which comprises first and second devices in communication with each other via a communication network, to perform functions of:
- during a communication session between the first and second devices, capturing, at the first device, a first speech spoken by a person, the first and second devices storing a speech model specific to the person;
- generating audio data representing the captured first speech;
- converting, based on the speech model stored at the first device, the audio data to text data representing the captured first speech;

during the communication session, transmitting, to the second device via the communication network, the audio data and the text data;

receiving, at the first device, a user input that trains the speech model stored at the first device, the user input comprising correction of the text data converted from the audio data;

updating, based on the received user input, a voice parameter value of the speech model stored at the first device;

during the communication session, transmitting, to the second device via the communication network, the updated voice parameter value of the speech model;

during the communication session, updating, at the second device, the speech model stored at the second device based on the updated voice parameter value transmitted to the second device; and converting, at the second device, the text data transmitted to the second device to a second speech based on the updated speech model stored at the second device.

* * * * *